United States Patent [19]

Klein

[11] 3,795,841
[45] Mar. 5, 1974

[54] SHOCK PROTECTING CIRCUIT BREAKER FOR TWO CIRCUITS WITH COMMON NEUTRAL

[75] Inventor: Keith W. Klein, Simsbury, Conn.
[73] Assignee: General Electric Company, New York, N.Y.
[22] Filed: July 19, 1972
[21] Appl. No.: 273,306

[52] U.S. Cl.................. 317/18 D, 317/27 R, 335/18
[51] Int. Cl............................................. H02h 3/28
[58] Field of Search......... 317/18 D, 27 R, 113, 119; 335/9, 10, 13, 18

[56] References Cited
UNITED STATES PATENTS

| 3,213,321 | 10/1965 | Dalziel | 317/27 R |
| 3,098,912 | 7/1963 | Sprague | 335/9 |
| 3,946,928 | 7/1960 | Slade | 317/119 |
| 3,192,447 | 6/1965 | Kenyeres et al. | 317/119 |
| 3,636,482 | 1/1972 | Edmunds | 317/18 D |

*Primary Examiner*—James D. Trammell
*Attorney, Agent, or Firm*—Robert T. Casey; Phillip L. Schlamp; Frank L. Neuhauser

[57] ABSTRACT

An electrical protective system comprising a panel assembly including an enclosure with two main incoming power bus bars having, in use, a given voltage between them, and a main neutral terminal having, in use, a voltage midway between the voltages of the aforesaid two conductors, combined with a unitary protective device comprising two electric circuit breakers each connected to a different one of the two power bus bars and each having a load terminal for connection to the outgoing load conductor of a separate load circuit to be protected. The protective device also includes a neutral terminal connected to the main neutral terminal and a load return conductor terminal for connection to a load return conductor which is common to the two circuits being protected. The protective device also includes means for monitoring the algebraic sum of the currents in the three load conductors comprising the two outgoing load conductors and the common load return conductor and for causing automatic opening of both of the circuit breakers if and when the algebraic sum of the currents in the three conductors exceeds a predetermined small amount, such, for example, as 5 milliamperes, whereby each of the protected circuits is protected against damage by ground fault currents, and whereby human beings are protected from possibly lethal electric shock by coming in contact with high potential points of either of the two circuits.

5 Claims, 7 Drawing Figures

3,795,841

SHOCK PROTECTING CIRCUIT BREAKER FOR TWO CIRCUITS WITH COMMON NEUTRAL

The present invention relates to electrical protective panel assemblies and to electrical protective devices for use therewith. More particularly, the invention relates to panel assemblies and protective devices of the type ordinarily used to protect branch circuit wiring in homes and other buildings from electrical overloads and from electrical ground fault conditions. Furthermore, the panel assembly and the protective device of the invention provide protection against electric shock to human beings coming in contact with a conductor of either of the protected circuits.

BACKGROUND OF THE INVENTION

Historically, electrical protective devices for branch wiring circuits of the type described have provided protection to the wiring of protected circuits against certain abnormal current conditions such as sustained overcurrent conditions and short-circuit current conditions. More recently, such devices have been improved by adding means for protecting the circuits involved from ground fault current conditions, including ground fault current conditions of very small values, such, for example, as 5 milliamperes. Such sensitive ground fault protection means not only protects the related circuit and greatly reduces the likelihood of fires due to faulty wiring conditions, but also provides protection to human beings against injury by electrical shock such as may be caused by a person coming in contact with one of the conductors of the protected circuit with one part of his body while another part of his body is in contact with an electrically grounded object, such as a water pipe, sink, appliance housing, etc. A circuit breaker having all of the protecting functions referred to in a unitary device is shown and described, for example, in co-pending application Ser. No. 171,770, now U.S. Pat. No. 3,742,305, C. F. Hobson and H. M. Dimond, assigned to the same assignee as the present invention.

In devices of the type of the aforesaid application, the sensitive ground fault and electric shock protection described is provided by means which monitors the algebraic sum of the currents in the outgoing and return load conductors of a given circuit and which triggers a sensitive electronic switch which in turn energizes a tripping solenoid causing opening of the circuit breaker and disconnecting the involved load circuit.

While such devices are eminently satisfactory for most applications, they are not suitable for use in applications where two separate load circuits share a common load return conductor. This is because the algebraic sum of the currents in the outgoing and return conductors of each of such circuits cannot be used as an indication of an abnormal condition in that circuit as required by such devices.

OBJECTS OF THE INVENTION

It is an object of the invention to provide an electric circuit protective panel assembly which includes means for protecting each of two separate load circuits from low level ground fault conditions even though the load circuits involved share a common load return conductor.

It is another object of the invention to provide a unitary circuit protective device for use in a circuit protective device panel assembly, which device includes two circuit breakers each adapted to be connected to protect one of two circuits having separate outgoing load conductors and a single common return conductor and which device includes means for protecting both circuits from low level ground fault conditions.

It is a further object of the invention to provide a unitary circuit protective device of the type described which has a form and dimension suitable for use in circuit protective device panel assemblies which are adapted to receive prior art type standard circuit breakers without modification of the panel assembly.

A further important object of the invention is to provide a unitary circuit protective device of the type described which is extremely compact and utilizes circuit breakers which incorporate a minimum of modification of prior art circuit breakers, combined with an accessory portion having essentially the same form and dimensions as prior art circuit breakers suitable for use in panel assemblies of the type adapted to receive such circuit breakers.

SUMMARY STATEMENT OF THE INVENTION

In accordance with the invention, a unitary circuit protective device is provided including two independent electric circuit breakers, and means which monitors the algebraic sum of the currents in both of the circuit breakers plus the current in a common return conductor. This net voltage is fed to an electronic switch which in turn controls a tripping solenoid which trips both breakers when and if the algebraic sum or net voltage exceeds a predetermined small amount. The device, moreover, is housed in an enclosure having a form and dimension allowing it to be used in prior art panel assemblies. Only a single electronic switch is used to trip both circuit breakers. When the device is mounted in such prior art panel assemblies, the two circuit breakers draw power from opposite sides of an AC power source, while the return conductor is at a potential substantially mid-way between that of the circuit breakers.

BRIEF DESCRIPTIONS OF THE DRAWINGS

DESCRIPTION OF A PREFERRED EMBODIMENT OF THE INVENTION

Figure 1:
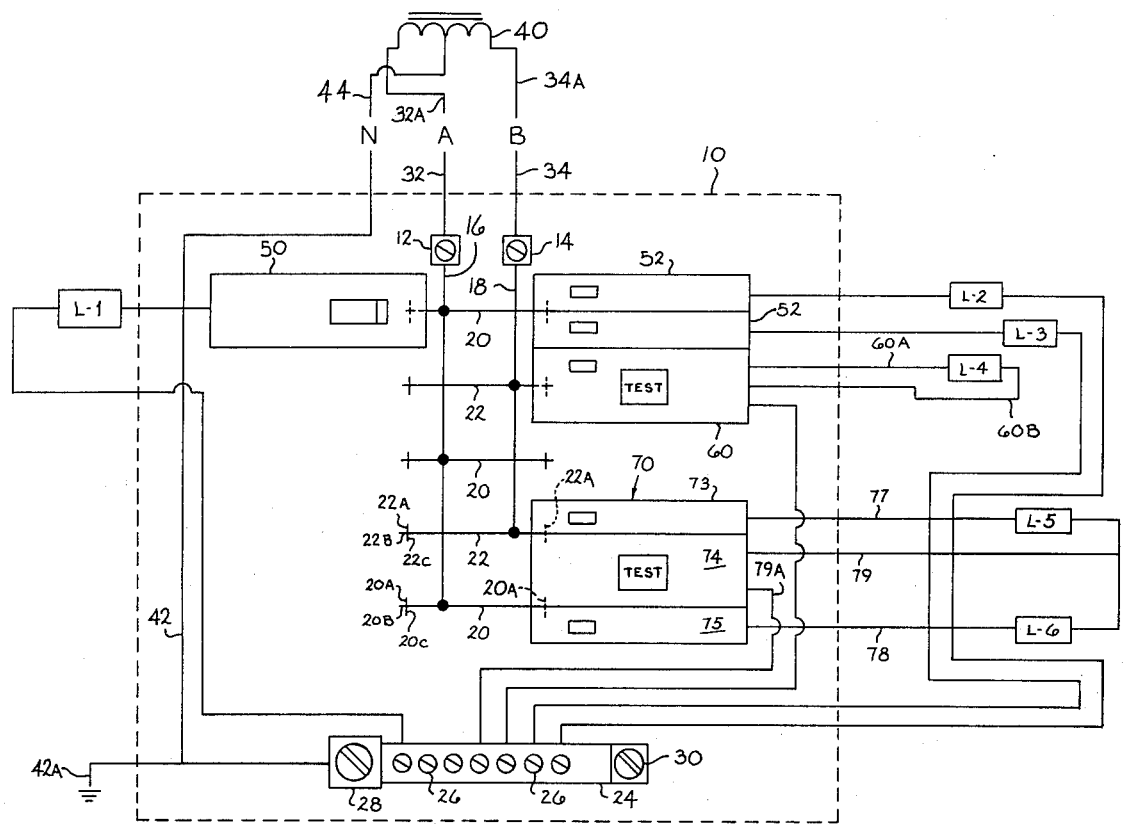
FIG. 1 is a semi-schematic drawing illustrating an electric circuit protective device panel assembly incorporating the invention.
Figure 2:
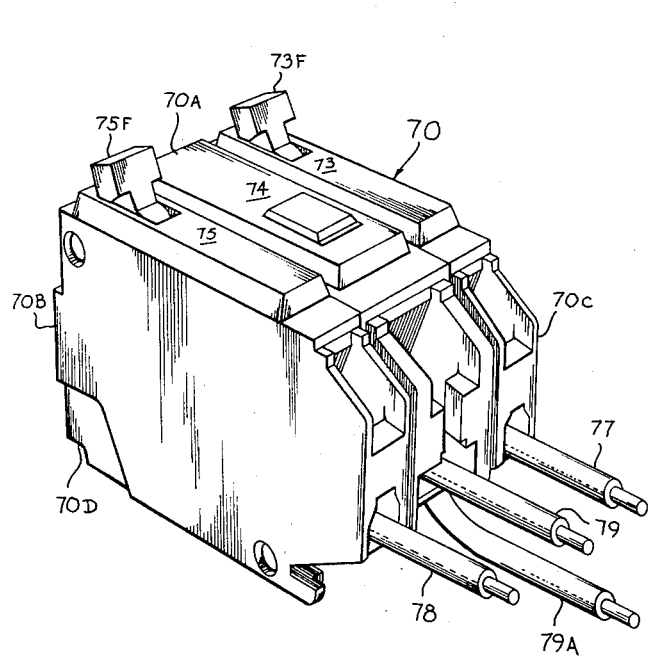
FIG. 2 is a perspective view of a unitary circuit protective device or circuit breaker in accordance with the invention, used in the panel assembly shown in FIG. 1.

Referring to FIG. 1, the invention is shown as incorporated in an electric circuit protective device panel assembly comprising an enclosing box 10 having a pair of incoming line connecting lugs 12 and 14 supported by suitable insulating means, not shown, in the box 10. Also supported in the box 10 by suitable insulating means, not shown, are a pair of main power bus bar conductors 16 and 18. The main bus bar conductors 16 and 18 have cross-wise extending branch straps 20 and 22, respectively. The branch connecting straps 20 are electrically connected to the main bus bar 16 and the branch connecting straps 22 are connecting to the main bus bar 18. The branch connecting straps 20 and 22 each have multiple contact surfaces 20A, 20B, 20C and 22A, 22B and 22C at each end thereof respectively, for a purpose to be described. The enclosing box 10 also supports a neutral connecting bar 24 having a plurality of individual wire connecting means 26 and a main connecting terminal portion 28. The neutral connecting bar 24 may be mounted in insulated relation to the box 10 if desired, or it may be directly connected or "bonded" to the enclosure 10 by suitable means such as by connecting screw 30. An "equipment ground" connecting strip, not shown, may also be provided in the box 10 if desired, to receive conductors connecting non-energized parts of load devices (such as housings, etc.) to ground at or adjacent the primary ground point (such as 42A) of the system.

In a typical application as illustrated in FIG. 1, the line connecting lugs or terminals 12 and 14 are connected to two incoming power conductors 32, 34 connected to a suitable power source, such as conductors 32A, 34A of the secondary winding 40 of a power transformer. The main neutral connector 28 is connected by suitable means such as by a conductor 42 to a neutral conductor 44 connected as a center tap to the power transformer secondary 40.

Each of the contact surfaces 20B, 22B, is adapted to receive and make connection with a single pole unit of "1-X" width dimension, (such, for example as 1 inch wide), as shown at 50. Each of the contact surfaces 20A, 20C and 22A, 22C, is adapted to receive and make contact with a circuit protective device of "1/2-X" width dimension, such as the circuit breakers 52. Since each of the branch connecting straps 20, 22, has two sets of contact surfaces 20A, 20B, 20C and 22A, 22B, 22C, as shown, it will be observed that each branch connecting strap can selectively receive and connect either two 1-X wide module circuit breakers 50, one 1-X module circuit breaker 50 and two 1/2-X module circuit breakers 52, or four 1/2-X width module circuit breakers 52. Each of the circuit breakers 50, 52 is adapted to be used to control and protect a given load circuit, such, for example, as the loads illustrated L1, L2, L3, and L4, by suitable outgoing conductors going from the circuit breakers to the load and return conductors coming from each of the respective loads and connected to the neutral connecting bar 24, as shown. While the particular construction of the circuit breakers 50 and 52 may vary widely, a circuit breaker 50 of the 1-X modul type is shown in prior patent 3,288,965 issued Nov. 29, 1966 to K. W. Klein and assigned to the same assignee as the present invention. Likewise, a circuit breaker 52 of the 1/2-X module type is shown in prior U.S. Pat. No. 3,488,610 issued Jan. 6, 1970 to D. B. Powell, and assigned to the same assignee as the present invention.

If desired, the contact surfaces 20A and 20C and 22A, 22C may be omitted, so that the branch connecting strap involved is then adapted to receive and connect only two 1-X module circuit breakers such as 50. Alternatively, the contact surfaces of 20B, 22B, may be omitted, in which case the corresponding branch connecting straps are adapted to receive and connect only four 1 2-X module circuit breakers 52.

The particular configuration of branch connecting straps and contacting surfaces may be varied widely. Particular forms and configuration of panel assemblies of the type referred to are shown, for example, in prior U.S. Pat. Nos. 2,738,446 issued Mar. 13, 1956 to W. J. Fleming and assigned to the same assignee as the present invention and U.S. Pat. No. 3,309,580 issued Mar. 14, 1967 to L.W. Jacobs et al, also assigned to the same assignee as the present invention. While a particular form of panel assembly of the type as shown in these aforesaid patents has been illustrated, involving plug-in type contact between the branch connecting straps and the circuit breakers, panel assemblies having a similar functional arrangement may be used in accordance with prior art teachings involving connections to circuit breakers made by "bolt-in" or screw-type connections. A patent showing such type of panel assembly, is shown for example in prior U.S. Pat. No. 3,411,042 issued Nov. 12, 1968 to K. W. Klein and assigned to the same assignee as the present invention. It will be further appreciated that while a circuit breaker panel assembly bus car contact configuration and breaker construction has been illustrated involving a plug-in type contacts using male type contacts on the bus bar connecting straps and female type connecting means on the circuit breakers, this may, if desired, be reversed without affecting the applicability of the present invention.

The circuit breakers 50, 52, illustrated, and as shown in the aforesaid patents, include means for protecting the circuits connected thereto from sustained overload conditions and high overload or short circuit-current conditions. The circuit breakers 50, 52, are commonly provided in accordance with the prior art in current ratings of for example 15, 20, 30, 50, and 100 amperes. The sustained overload, high overload and short circuit currents which are protected against, are accordingly higher than these nominal current carrying values. In addition, in FIG. 1 there is illustrated another type of prior art circuit protective device or circuit breaker 60, more recently developed, which, in addition to protecting the connected circuit from sustained overloads, high overloads and short circuit conditions, protects the circuit from ground fault conditions, and particularly from low level ground fault conditions, such as involving currents as low as 5 milliamperes.

The circuit breaker 60, by providing protection against low level ground fault currents as low as 5 milliamperes, not only protects against possible damage to conductors and associated equipment by electrical ground faults, but also affords protection to human beings who might inadvertently come in contact with the "high" or outgoing load conductor side of the circuit with one part of his body while having another part of his body in contact with an object which is electrically connected to ground. This additional protection is afforded by including in the circuit breaker 60 current unbalance detection means, not shown, which detects small differences in the current in the outgoing conductor 60A compared to the current in the return conductor 60B. This detected unbalance signal is fed to an electronic switch which energizes a solenoid which in turn trips the associated circuit breakers. A circuit breaker such as 60 which includes overload, short circuit, and sensitive ground fault protection is disclosed in the aforementioned application serial number 171,770.

Each of the circuit protective devices or circuit breakers 50, 52 and 60 controls and protects a particular circuit. Thus breakers 50, 52, 53, and 60 protect circuits including the loads L-1, L-2, L-3, and L-4, respectively. It will be observed that each of these circuits has its own outgoing and return conductors, independent of the outgoing and return conductors of the other circuits.

In accordance with the present invention, a novel protective device 70 is provided which is used with loads L-5 and L-6, each of which has its own "outgoing" conductor, 77 and 78 respectively between the protective device and the load, but both of which loads share a common "return" conductor 79 between the protective device and the load.

Referring particularly to FIGS. 2-5, the device 70 comprises a casing of insulating material having a top wall 70A, a bottom wall 70D, a front or "line" end 70B, a back or "load" end 70C, and opposed side walls (not numbered). The insulating casing of the device 70 comprises three sections or compartments 73, 74, 75.

Figure 5:
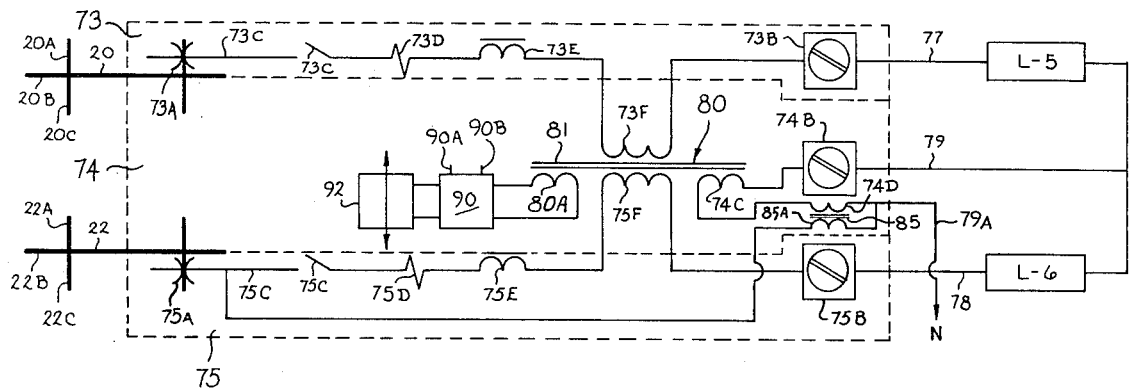
FIG. 5 is a semi-schematic drawing showing the internal wiring connections of the circuit protective device of FIG. 2.

Referring particularly to FIG. 5, each of the compartments 73 and 75 houses or comprises an independent singlepole electric circuit breaker. Each of the breakers 73, 75, respectively includes a plug-on type terminal 73A, 75A, a load terminal connector 73B, a movable contact member 73C, 75C, an inverse-time current responsive trip device 73D, 75D, and direct-acting trip device 73E, 75E, respectively. The term "inverse-time" is used to refer to a current responsive device whose response time varies inversely with the magnitude of current. The most common example of inverse-time current responsive means is a bimetallic strip. The term "direct-acting" is used to refer to a current responsive device which does not have "inverse-time" characteristics. The most common example of direct-acting current responsive means is an electromagnet or solenoid. In addition, each of the circuit breakers 73, 75 includes an operating mechanism, not shown, for manually operating the respective movable contact 73C, 75C, between open and closed circuit positions, and including a releasable normally latched member which is releasable to cause automatic opening of the respective movable contact 73C, 75C. The operating mechanisms of the circuit breakers 73 and 75 are adapted to be operated by a manually engageable operating handle 73F, 75F, see FIG. 2.

The particular structural arrangement of the operating mechanisms, the line and load terminals, and the inverse-time and direct-acting trip devices of the circuit breakers 73 and 75 may be of any desired form. A particular structural arrangement, however, suitable for use in a combination substantially of the form and proportions illustrated herein is shown in the aforementioned U.S. Pat. No. 3,488,610 issued Jan. 6, 1970 to D. B. Powell and assigned to the same assignee as the present invention. It will also be appreciated, however, that in certain applications, either of the inverse-time or direct-acting tripping means 73D, 75D and 73E, 75E may be omitted if desired. Furthermore, it is within the contemplation of the present invention that if desired, the circuit breakers 73, 75, may be utilized without either the inverse time tripping member 73D, 75D or the direct acting tripping means 73E, 75E, so long as the mechanism is provided with a releasable tripping means. Such an application may exist, for example, where it is desired to utilize the device 70 to provide only ground fault and/or human shock protection to the controlled circuits.

Referring to FIG. 1, a panel assembly and circuit arrangement including the device 70 is illustrated. As shown, the device 70 is arranged in the panel assembly so that the circuit breaker 73 contacts a contact surface 22A of one of the cross connecting straps 22, and the circuit breaker 75 contacts a contact surface 20A of one of the branch connecting straps 20. The circuit breaker 73 is connected by an outgoing load power conductor 77 to a load L-3, and the circuit breaker 75 is connected by an outgoing load power conductor 78 to a separate load L-6. Current from both of the loads L-5 and L-6, however, returns to the circuit protective device 70 in the common load return conductor 79. Current flows from the conductor 79 through the central portion 74 of the device 70 in a manner to be described, and then to the neutral bar conductor 24.

In the form shown, each of the circuit breakers 73, 75 may be turned on or off independently, and may be tripped by its own inverse-time and/or direct acting means.

While the circuit breakers 73, 75, have been shown as being electrically and mechanically independent and capable of independent operation, including independent manual operation by the handle members 73F, it is within the contemplation of the invention that the handles 73F, 75F may be tied together rigidly or with handle-tie means permitting a small amount of relative motion, if desired. If this is done, it is further within the contemplation of the invention to provide common tripping means operable upon tripping of either breaker, thereby enabling the circuit breaker 73, 75 to serve as a true, 2-pole circuit breaker.

It will be further observed that since the circuit breakers 73, 75 are connected to different ones of the two main bus bars 17, 18, which are connected to opposite ends of the incoming AC power source (transformer secondary winding 40), and further, since the return conductor 79 is connected to the neutral conductor 42, which is connected to a center tap on the transformer 40, the potential appearing between each of the bus bars 17, 18, and the neutral conductor 24, will be equal and opposite at all times. This further means that the currents flowing in the conductors 77 and 78 are in opposite directions at any given instant, and therefore subtract from each other in the common return conductor 79. Therefore, the conductor 79 in the circuit illustrated never has flowing in it a current greater than the current flowing at that instant in one or the other of the conductors 77, 78.

By the same token, when both circuits are in operation, the current flowing in the return conductor 79 will ordinarily be of a value substantially different from the value of current flowing in either one of the conductors 77, 78 at that time. Accordingly, it is not possible to utilize a low level ground fault protector and shock protecting device of the type described in the aforesaid application serial no. 171,770 for either or both of the circuits L-5 and L-6, since such a device would interpret the inequality of currents in the outgoing and return conductors as indicating a ground fault, and would trip the breaker.

In accordance with the present invention, however, a circuit protective device, indicated generally at 70, is provided, which includes two independent circuit breakers 73 and 75, which is eminently suited to provide protection of the various types described for the circuits L-5 and L-6, by the means to be described.

As previously described, the circuit protective device 70 includes, in addition to the pair of electric circuit breakers 73 and 75, an intervening chamber or compartment 74 which in the form shown is substantially twice as wide as either of the circuit breakers 73, 75. A differential transformer 80 is contained in the chamber 74, and includes windings 73F and 75F, connected in series with the circuit breakers 73, 75, respectively.

The differential transformer 80 also includes a winding 74C, which is connected by means of a connecting lug 74B to the return conductor 79. The winding 74C is also connected, in series with a winding 74D of a transformer 85, to the terminal wire 79A which is carried by projects from the protective device 70. The current path from the conductor 79 may be traced to the connector 74B, to the winding 74C, to the winding 74D, to the wire 79A, to the neutral bar 24.

As stated, the voltage between the conductors 77 and 79 such as 110 or 120 volts, is equal and opposite at any given point of time to that between the conductors 78 and 79. It follows, therefore, that the currents drawn by the loads L-5 and L-6 flow in opposite directions in the return conductor 79 and therefore subtract from each other. The current in the conductor 79 will ordinarily, therefore, be less than the current in either of the conductors 77, 78 when both circuits are in operation, and it will never be greater than the current in either conductor 77 or 78. Moreover, at any given instant of time, the currents in the three conductors 77, 78, and 79 will add algebraically to zero, so long as there is no ground fault existing in either of the circuits.

If, however, a ground fault should exist between any of the conductors 77, 78, 79, and ground, it would be possible for at least some of the current of the loads L5, L6, to return to the grounded neutral conductors 42, 44 by a path that does not include the winding differential transformer 74C.

In the event of this occurring, the algebraic sum of the currents in the windings 73F, 75F, and 74C would be other than zero, and a net voltage would appear across the secondary winding 80A. It will therefore be seen that the differential transformer 80 constitutes a signal generating means for generating a signal related to the algebraic sum of the currents in three conductors, i.e., conductors 77, 78, and 79.

The voltage appearing across winding 80A is fed as a signal to an electronic switch 90 which, in turn, is connected to a solenoid 92. When the solenoid 92 is energized by the electronic switch 90, it operates to cause tripping of both of the circuit breakers 73 and 75 by rotation of a trip member in a manner which may be as shown and described in the U.S. Pat. No. 3,256,407 Klein, issued June 14, 1966 and assigned to the same assignee as the present invention.

It will therefore be seen that each of the circuits of L-5 and L-6 is protected against ground faults, including low level ground faults, and provides protection against electric shock to human beings coming in contact with the high side of either or both of these loads. The electronic switch 90 used with the invention may take any of a number of well understood forms.

One particular form of electronic switch is shown and described in U.S. Pat. No. 3,657,604 issued Apr. 18, 1972 to H. G. Willard, and another is shown in U.S. Pat. No. 3,619,723 issued Nov. 9, 1971 to J. P. Walden, both assigned to the same assignee as the present invention.

In addition to the winding 74D, the transformer 85 includes a winding 85A. The winding 85A is connected to a source of power, such as by connecting it between the contact 75A and the conductor 79A as shown. The windings 74D and 85A of the transformer 85 are wound so that a voltage is induced in the winding 74D by current in the winding 85A. Such induced voltage may be very small, such, for example, as 0.03 volts. By this means, however, if the conductor 79 should accidentally become grounded, a current will pass, due to this induced voltage, from 79 to ground, through the ground to the grounded point 42A, and through the conductor 79A and the winding 74C. The presence of this current creates an unbalance in the differential transformer 81 and causes tripping of the breakers. This assures that the device will not be rendered inoperative by such a ground condition on the conductor 79.

It will be observed that in accordance with the invention, low level ground fault protection is provided to each of the two circuits L-5 and L-6 without interfering with the thermal and magnetic tripping means in each of the circuit breakers. It will further be observed that the protection described is provided to each of the two circuits L-5 and L-6 by only a single signal-generating means, electronic switch and tripping solenoid.

Power may be supplied to the electronic switch means 90 by any suitable means, such as by leads 90A and 90B being connected, by conductor means not shown, between one of the stationary contacts 73C, 75C, and the return conductor 79A. By this means, the electronic switch 90 is provided with power to operate the solenoid 92 whether or not one of the circuit breakers 73, 75, is in the open circuit position.

Figure 3:
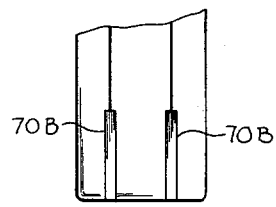
FIG. 3 is a fragmentary end view of the line end of the circuit protective device of FIG. 2.
Figure 4:
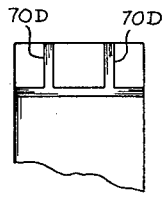
FIG. 4 is a fragmentary end view from the bottom, of the circuit protective device of FIG. 2.

Referring to FIGS. 3 and 4, it will be observed that the protective device 70 is provided at the line or front end 70B and the back wall 70D, with clearance slots 70B to provide clearance for the contact surfaces 20B, 22B. In addition, the bottom wall 70D of the unit 70 is provided with clearance slots 70D which also provide clearance for the contact surfaces 20B, 22B, as well as for the contact surfaces 20A and 22A.

It will be further observed that because of the proportions of the center section 74 and the circuit breakers 73, 75 it is not possible to mount the protective unit 70 by mistake in any position except a position as indicated, in which the circuit breaker 73 makes contact with a contact member 22 and the circuit breaker 75 makes contact with a contact member 20 or in which the circuit breaker 73 makes contact with a contact member 20 and the circuit breaker 75 makes contact with a contact member 22.

Figure 6:
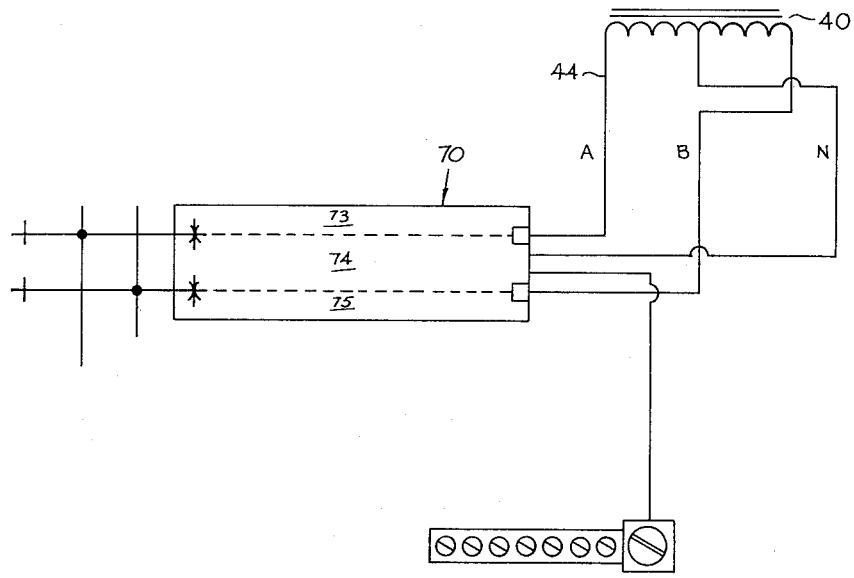
FIG. 6 is a schematic drawing of a portion of a circuit protective panel assembly incorporating another embodiment of the invention.

If desired, the protective device 70 may be utilized as a main circuit breaker by being "back-fed" as illustrated in FIG. 6. In this case, the main lugs 12 and 14 are omitted or replaced by contacts adapted to contact with the circuit breakers 73 and 75. In this case, a ground fault occurring on any circuit in the panel assembly causes an unbalance to appear in the protective device 70 and causes tripping of both of the circuit breakers 73 and 75. In this application, it would be desirable to have the operating handles 73F and 75F of the circuit breakers 73, 75, ganged together for movement simultaneously.

Figure 7:
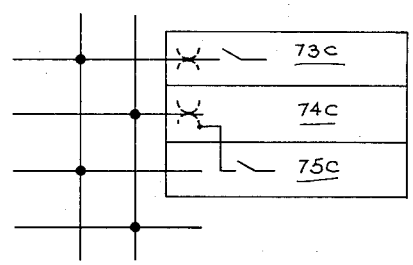
FIG. 7 is a schematic drawing of another embodiment of the invention.

In the form of the invention shown in FIG. 7, the circuit breakers 73C, 75C, are of the same width as the center section 74C. The plug-on contacts of the circuit breakers are, however, still maintained on a spacing such that they will engage panel contacts of differing voltage, as shown. Each section may, for example, be 1-inch in width, and the panel contacts may be spaced apart 1-inch.

While the invention has been shown and described in only certain specific embodiments, it will be readily appreciated that many modifications thereof may readily be made and it is therefore intended by the appended claims to cover all such modifications as fall within the true spirit and scope of the invention.

I claim:

1. An electrical protective device comprising:
   a a casing;
   b first and second independently operable automatic circuit breakers respectively occupying first and second compartments of said casing, said compartments being of equal width;
   c each said circuit breaker having associated line terminals for connection to a power source and load terminals;
   d an externally accessible line neutral terminal for connection to the power source and a second externally accessible load neutral terminal;
   e a neutral conductor member within said casing interconnecting said line and load neutral terminals;
   signal generating means for generating a signal related to the algebraic sum of the currents flowing between the line and load terminals of said circuit breakers and through said neutral conductor member, said signal generating means occupying a third compartment of said casing of a width equal to the combined widths of said first and second compartments;
   g electronic switch means occupying said third compartment and activated in response to a signal from said signal generating means; and
   h means occupying said third compartment and actuated by said electronic switch for causing automatic opening of both said circuit breakers;
      1 whereby each of said circuit breakers may be connected to a separate load by separate outgoing load conductors connected to said load terminals with the loads sharing a common third conductor connected to said load neutral terminal, and
      2 whereby a ground fault occurring in either of the load circuits causes automatic opening of both said circuit breakers.

2. An electrical protective device as set forth in claim 1 wherein said third compartment is located between said first and second compartments.

3. An electrical protective device as set forth in claim 1 wherein each of said circuit breakers has a line terminal at one end and a load terminal at the opposite end and wherein said third compartment has said line and load neutral connecting terminals at one end thereof adjacent said load terminals of said circuit breakers.

4. An electrical protective system comprising:
   a an enclosure;
   b at least two main power bus bars supported in insulated relation in said enclosure;
   c a main neutral connecting terminal supported in said enclosure;
   d means connecting said main power busbars each to one of two terminals of a source of electric power of predetermined voltage;
   e means connecting said neutral terminal to a third terminal of said source of electric power having a voltage between it and a first one of said two terminals substantially equal and opposite to the voltage between said third terminal and the other of said two terminals;
   f an electrical protective device comprising two independently operable electric circuit breakers each connected to a different one of said main power bus bars;
   g at least two electric power consuming loads located remote from said enclosure;
   h first and second outgoing load conductors each having one end connected to a different one of said circuit breakers and having its other end connected to a different one of said loads;
   i a common return conductor having one end connected to both of said loads closely adjacent thereto and having its other end connected to a first neutral connecting terminal of said protective device;
   j a neutral conductor means connecting said main neutral connecting terminal to a second neutral connecting terminal of said protective device;
   k a neutral conductor member internally of said protective device connecting said first and second neutral connecting terminals of said device;
   l said protective device including current unbalance signal generating means for generating a predetermined signal related to the algebraic sum of the currents in both of said circuit breakers and in said neutral conductor member interconnecting said first and second neutral connecting terminals of said protective device;
   m said protective device also including electrically operable means connected to said current unbalance signal generating means and causing automatic opening of both of said circuit breakers upon generation of said predetermined signal by said current unbalance signal generating means, whereby a ground fault occurring in either of the circuits comprising said two outgoing load conductors, said loads and said common return conductor causes automatic opening of both said circuit breakers;
   n said electric protective panel assembly including a row of stationary contacts connected in alternating sequence to said power bus bars respectively in a predetermined equal spacing, said circuit breakers of said protective device having connecting terminals spaced apart a distance equal to said predetermined spacing for connection thereto; and
   o a casing having first and second compartments each containing one of said circuit breakers and a third compartment containing said current unbalance signal generating means and said electrically operable means, said third compartment having a width equal to the combined widths of said first and second compartments.

5. An electrical protective panel assembly as set forth in claim 4 wherein said third compartment is situated intermediate said first and second compartments.

* * * * *